(12) United States Patent
Suzuki et al.

(10) Patent No.: US 11,965,607 B2
(45) Date of Patent: Apr. 23, 2024

(54) BUTTERFLY VALVE

(71) Applicant: CKD CORPORATION, Komaki (JP)

(72) Inventors: Yuko Suzuki, Komaki (JP); Keiichi Nishikawa, Komaki (JP)

(73) Assignee: CKD CORPORATION, Komaki (JP)

( * ) Notice: Subject to any disclaimer, the term of this patent is extended or adjusted under 35 U.S.C. 154(b) by 75 days.

(21) Appl. No.: 17/204,535

(22) Filed: Mar. 17, 2021

(65) Prior Publication Data

US 2021/0301941 A1 Sep. 30, 2021

(30) Foreign Application Priority Data

Mar. 27, 2020 (JP) .................. 2020-057755

(51) Int. Cl.
*F16K 31/04* (2006.01)
*F16K 1/22* (2006.01)
*F16K 37/00* (2006.01)

(52) U.S. Cl.
CPC .......... *F16K 37/0041* (2013.01); *F16K 1/221* (2013.01); *F16K 31/041* (2013.01)

(58) Field of Classification Search
CPC ....... F16K 37/0041; F16K 1/221; F16K 31/04
See application file for complete search history.

(56) References Cited

U.S. PATENT DOCUMENTS

| | | | | |
|---|---|---|---|---|
| 4,785,221 A | * | 11/1988 | Neko | .................. G05B 19/4062 |
| | | | | 318/362 |
| 9,996,088 B2 | * | 6/2018 | Ohashi | .................. F24F 5/0003 |
| 2019/0331257 A1 | * | 10/2019 | Nagai | ............... H01L 21/67126 |

FOREIGN PATENT DOCUMENTS

| | | | | |
|---|---|---|---|---|
| CN | 1525094 A | * | 9/2004 | |
| CN | 105929826 A | * | 9/2016 | .......... G05D 1/0242 |
| CN | 205647195 U | * | 10/2016 | |
| JP | 2003-269652 A | | 9/2003 | |
| JP | 2010-124645 A | | 6/2010 | |
| JP | 2013153607 A | * | 8/2013 | ............... G05B 9/02 |
| JP | 2017-141954 A | | 8/2017 | |
| JP | 2019-019851 A | | 2/2019 | |
| JP | 2019019851 A | * | 2/2019 | |

(Continued)

OTHER PUBLICATIONS

Feb. 7, 2023 Office Action issued in Japanese Patent Application No. 2020-057755.

(Continued)

*Primary Examiner* — Angelisa L. Hicks
(74) *Attorney, Agent, or Firm* — Oliff PLC

(57) ABSTRACT

A butterfly valve to be placed on a pipe between a vacuum chamber provided with a pressure sensor and a vacuum pump is configured to control the pressure in the vacuum chamber. The butterfly valve includes a servo motor, a butterfly valve element to be rotated about a rod connected to the servo motor in an opening or closing direction, and a control unit to adjust an opening degree of the butterfly valve element based on a pressure value of the vacuum chamber detected by the pressure sensor. The control unit is provided with an abnormal vibration detection program configured to whether or not abnormal vibration is occurring in the servo motor based on a variation amount of the opening degree of the butterfly valve element within a monitoring time while at least the pressure value of the vacuum chamber is stable.

8 Claims, 6 Drawing Sheets

(56) References Cited

FOREIGN PATENT DOCUMENTS

| | | | |
|---|---|---|---|
| TW | 201341997 | A | 10/2013 |
| TW | 201732480 | A | 9/2017 |
| WO | 2013/153607 | A1 | 10/2013 |

OTHER PUBLICATIONS

Feb. 20, 2023 Office Action issued in Chinese Patent Application No. 202110324757.6.

\* cited by examiner

BUTTERFLY VALVE

CROSS-REFERENCE TO RELATED APPLICATIONS

This application is based upon and claims the benefit of priority from the prior Japanese Patent Application No. 2020-057755 filed on Mar. 27, 2020, the entire contents of which are incorporated herein by reference.

BACKGROUND

Technical Field

The present disclosure relates to a butterfly valve to be placed on a pipe between a vacuum chamber provided with a pressure sensor and a vacuum pump to control the pressure in the vacuum chamber, the butterfly valve including a motor, a butterfly valve element configured to rotate about a rotary shaft coupled to the motor in an opening or closing direction, and a control unit to adjust an opening degree of the butterfly valve element based on a pressure value of the vacuum chamber detected by the pressure sensor.

Related Art

In a semiconductor manufacturing device, heretofore, there are used a vacuum chamber for a film deposition or coating process on wafers using process gas and a vacuum pump for exhausting the gas from the vacuum chamber. On a pipe between the vacuum chamber and the vacuum pump, a butterfly valve is placed to control the internal pressure of the vacuum chamber. The butterfly valve is for example provided with a motor and a butterfly valve element as disclosed in Japanese unexamined patent application publication No. 2019-019851, in which the butterfly valve element is configured to rotate about a rotary shaft coupled to the motor in an opening/closing direction. The opening degree of the butterfly valve element is adjusted by control of the motor based on the pressure value of the vacuum chamber. By this adjustment of the opening degree, the internal pressure of the vacuum chamber is controlled.

To adjust the internal pressure of the vacuum chamber to a target pressure value, the opening degree of the butterfly valve element of the butterfly valve is to be controlled to an opening degree corresponding to the target pressure value. However, while the internal pressure of the vacuum chamber reaches and remains at the target pressure value, the butterfly valve element is not always held constant at a predetermined opening degree without moving at all. That is, minute variation or change of the opening degree may be repeated under the pressure control so that the pressure value of the vacuum chamber is kept stable.

SUMMARY

Technical Problems

However, the foregoing conventional art has the following problems. In the butterfly valve, specifically, if control parameters of the motor mismatches or mechanical sliding resistance increases due to assembling failure and aging degradation, the motor may abnormally vibrate.

Especially, as the atomic layer deposition (ALD) has been widely used in recent years, the occurrence of abnormal vibration in a motor becomes a significant problem. This ALD shortens a semiconductor manufacturing cycle, in which a plurality of kinds of gases is used per one cycle, so that pressure control of the vacuum chamber using the butterfly valve is also speeded up. To address this speed-up of the pressure control, the time needed to operate the butterfly valve element from a fully open position to a fully closed position and otherwise has to be speeded up to as fast as about 0.1 seconds. From the viewpoint of such a background, the butterfly valve uses a servo motor to increase gain in order to accelerate a reaction speed. The increased gain allows the reaction speed of the servo motor to increase, whereas the response of the servo motor becomes too good. This may cause the following problem: even if the butterfly valve element is to be stopped at a predetermined opening degree, the butterfly valve element is hard to be stopped and minute variation of the opening degree is unnecessarily repeated. This unnecessary variation of the opening degree may result in abnormal vibration of the servo motor.

If the abnormal vibration of the motor mentioned above is left uncontrolled, this may lead to breakage of the butterfly valve, such as wearing of a seal member used in the butterfly valve and breakage of a bearing that supports a rotary shaft. If the butterfly valve is broken, the semiconductor manufacturing device needs to be stopped from operating to replace the butterfly valve with a new one. This work may decrease the efficiency of semiconductor manufacturing. Accordingly, it is necessary to monitor so that the abnormal vibration of the motor is not left uncontrolled.

To detect such abnormal vibration of the motor, it is conceivable to attach an acceleration sensor to the butterfly valve. However, the addition of a new component will increase a cost. Furthermore, even if the accelerator is attached to the butterfly valve in a semiconductor manufacturing device, many driving mechanisms of the semiconductor manufacturing device will also individually vibrate and thus it is difficult to detect the vibration of only the motor of the butterfly valve.

The present disclosure has been made to address the above problems and has a purpose to provide a butterfly valve capable of reliably detecting abnormal vibration that occurs in a motor while suppressing an increase in cost.

Means of Solving the Problems

To achieve the above-mentioned purpose, one aspect of the present disclosure provides a butterfly valve to be placed on a pipe between a vacuum chamber provided with a pressure sensor and a vacuum pump to control pressure in the vacuum chamber, the butterfly valve comprising: a motor; a butterfly valve element configured to rotate about a rotary shaft coupled to the motor in an opening direction and a closing direction; and a control unit configured to adjust an opening degree of the butterfly valve element based on a pressure value of the vacuum chamber detected by the pressure sensor, wherein the control unit is provided with an abnormal vibration detection program configured to determine whether or not abnormal vibration is occurring in the motor based on a variation amount of the opening degree of the butterfly valve element within a predetermined time period while at least the pressure value of the vacuum chamber is stable.

The butterfly valve configured as above can reliably detect the abnormal vibration of the motor while suppressing an increase in cost.

To adjust the pressure in the vacuum chamber, i.e., the internal pressure, to a target pressure value, the opening degree of the butterfly valve element of the butterfly valve is to be controlled to an opening degree corresponding to the target pressure value. However, even when the internal pressure of the vacuum chamber reaches the target pressure value and further remains stable thereat, the butterfly valve element is not always held constant at a predetermined opening degree without moving at all. That is, in order to keep the pressure stable, the butterfly valve element may repeat minute variation or change of the opening degree (hereinafter, simply referred to as minute variation) under the pressure control. In such a circumference, the present applicant found that minute variation is also caused when abnormal vibration has occurred in the motor and further found that the cycle of minute variation is different between the normal minute variation generated under pressure control and the minute variation that occurs when the motor is abnormally vibrating. The cycle of minute variation caused when the motor is abnormally vibrating is as short as about one-several tenth of the cycle of minute variation when the motor is normal. Since the control unit is provided with the abnormal vibration detection program configured to determine whether or not abnormal vibration is occurring in the motor based on the variation amount of the opening degree of the butterfly valve element within the predetermined time (e.g., a sufficient short time as compared with the cycle of minute variation in the normal state of the motor) while the pressure value in the vacuum chamber is stable, it is possible to distinguish between the normal minute variation under the pressure control and the minute variation caused when the motor is abnormally vibrating, and hence detect the abnormal vibration that occurs in the motor.

The abnormal vibration detection program determines whether or not the abnormal vibration is occurring based on the variation amount of the opening degree of the butterfly valve element without directly detecting the vibration by use of an accelerator sensor or the like. Thus, any additional component, such as an accelerator sensor, is not necessary, so that cost increase is prevented. As above, whether or not the abnormal vibration is occurring is determined based on the variation amount of the opening degree of the butterfly valve element. Accordingly, even when the butterfly valve is incorporated in a semiconductor manufacturing device, it is possible to reliably detect the vibration of only the motor without being confused by other vibrations of many driving mechanisms of the semiconductor manufacturing device. This can prevent the abnormal vibration from being left uncontrolled, leading to breakage of the butterfly valve, and thus can prevent a decrease in the efficiency of semiconductor manufacturing.

How much variation of the butterfly valve element is judged to be abnormal is set according to a usage condition of the butterfly valve and further the predetermined time is arbitrarily set to a sufficiently short time (e.g., 20 to 40 msec) as compared with the cycle of minute variation in the normal state.

The butterfly valve of the present disclosure can make sure detection of abnormal vibration of the motor while preventing an increase in cost.

DETAILED DESCRIPTION OF THE EXEMPLARY EMBODIMENTS

A detailed description of an embodiment of a butterfly valve according to the present disclosure will now be given referring to the accompanying drawings.

Figure 1:
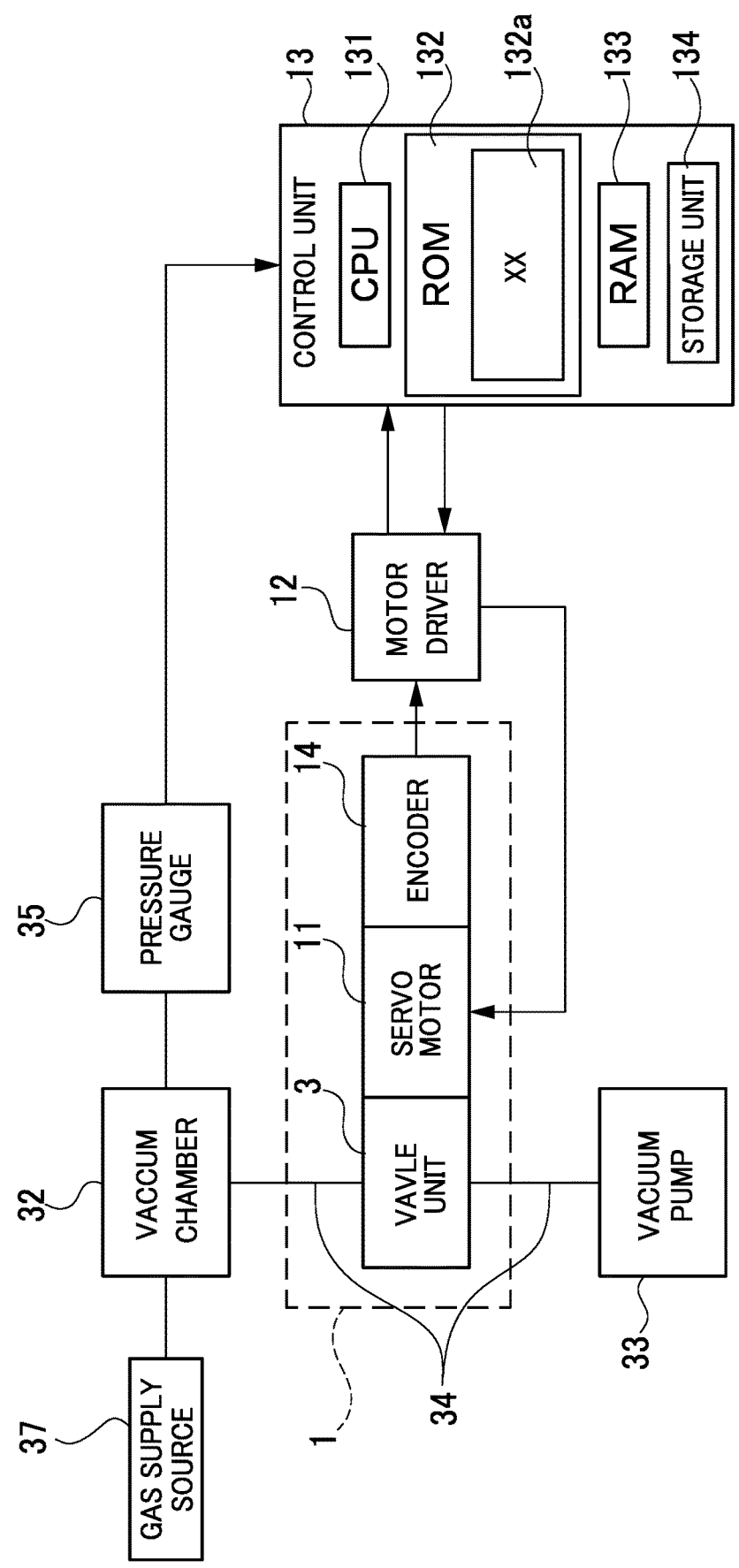
FIG. 1 is a schematic view of a vacuum pressure control system incorporating a butterfly valve.

The configuration of a butterfly valve in the present embodiment will be described below. FIG. 1 is a schematic diagram of a vacuum pressure control system incorporating a butterfly valve 1 in a semiconductor manufacturing device. For example, in the semiconductor manufacturing device, the butterfly valve 1 is placed on a pipe 34 connecting a vacuum chamber 32 and a vacuum pump 33 as shown in FIG. 1 and is used as a vacuum pressure control device for controlling the internal pressure of the vacuum chamber 32 to which gas is supplied from a gas supply source 37.

Figure 2:
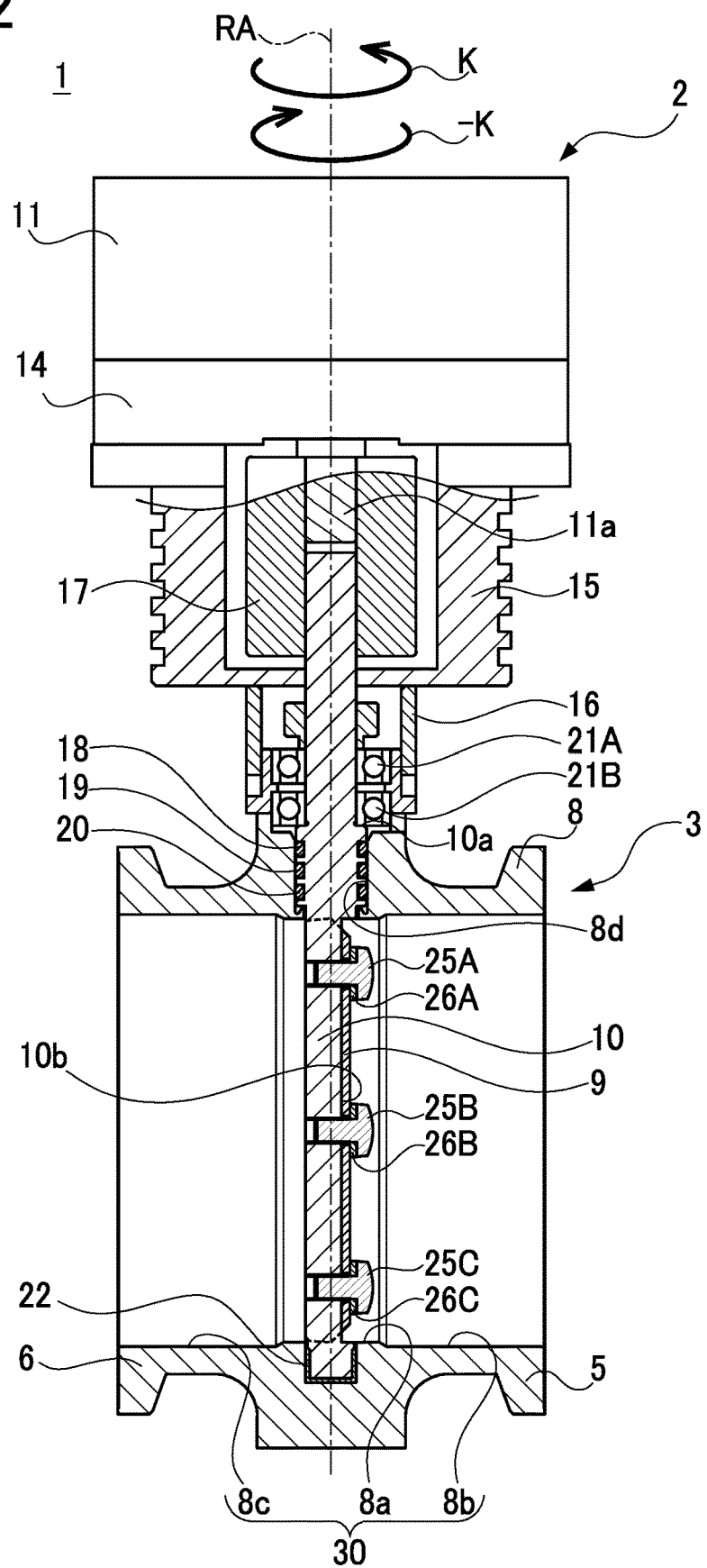
FIG. 2 is a cross-sectional view of the butterfly valve taken in a direction parallel to an axis of a motor shaft and parallel to a passage.

FIG. 2 is a cross-sectional view of the butterfly valve 1 in the present embodiment, taken in a direction parallel to an axis RA of a motor shaft 11a and also parallel to a passage 30.

The butterfly valve 1 mainly includes a drive unit 2 and a valve unit 3 as shown in FIG. 2. The drive unit 2 includes a servo motor (one example of a motor) 11. The servo motor 11 is coupled to a motor driver 12 and an encoder 14 as shown in FIG. 1. Further, the motor driver 12 is connected to a control unit 13. The servo motor 11 includes a motor shaft 11a as shown in FIG. 2. Herein, the rotation center of the motor shaft 11a is assumed as an axis RA.

The control unit 13 is connected to the motor driver 12 and a pressure sensor 35 to detect the internal pressure of the vacuum chamber 32 as shown in FIG. 1. The control unit 13 includes a CPU 131, a ROM 132, a RAM 133, and a storage unit 134. The ROM 132 is configured to store an abnormal vibration detection program 132a configured to detect abnormal vibration that occurs in the servo motor 11. The CPU 131 is configured to calculate a variation amount of a butterfly valve element 9 mentioned later based on pulses output by the encoder 14 while temporarily storing data in the RAM 133, and monitor whether or not the servo motor 11 is abnormally vibrating (the details will be described later).

The storage unit 134 is configured to store for example a fully closed position and a fully open position of the butterfly valve element 9, and a rotation angle of the motor shaft 11a (i.e., a rotation angle of a rod 10 and the butterfly valve element 9) corresponding to any target pressure value of the vacuum chamber 32. Based on a rotation angle read from the storage unit 134, the motor driver 12 controls the rotation of the servo motor 11.

The motor shaft 11a is connected with one end (an upper end in FIG. 2) of the rod (one example of a rotary shaft) 10 inserted in the valve unit 3 through a metal plate spring coupling 17 as shown in FIG. 2. Thus, even when the rod 10 is heated by process gas (e.g., about 200° C. of gas) flowing through a passage 30 mentioned later, the coupling 17 serves to prevent the heat from transferring to the servo motor 11.

The drive unit 2 is connected to the valve unit 3 through a heatsink 15 and a heat insulating member 16. This configuration can prevent the heat of the valve unit 3 heated by the process gas or a heater 27 mentioned later from transferring to the drive unit 2.

The valve unit 3 coupled to the drive unit 2 includes a valve body 8 and a butterfly valve element 9. The valve body 8 is made of stainless steel that is resistant to corrosion and heat.

The valve body 8 is provided with a joint 5 on the right end and a joint 6 on the left end in FIG. 2. The joint 5 has an inner peripheral surface defining an inlet passage 8b and the joint 6 has an inner peripheral surface defining an outlet passage 8c. A valve hole 8a is defined by an inner peripheral surface having a circular-arc cross-section in FIG. 3 between the inlet passage 8b and the outlet passage 8c. The inlet passage 8b, the valve hole 8a, and the outlet passage 8c are provided coaxially and communicated with each other, forming a continuous flow passage 30. In a semiconductor manufacturing process, for example, as shown in FIG. 1, the joint 5 is coupled to the vacuum chamber 32 through a pipe 34 and the joint 6 is coupled to the vacuum pump 33 through another pipe 34 to release gas (e.g., process gas) from the vacuum chamber 32 through the flow passage 30.

The valve body 8 includes an insertion through hole 8d that opens on an end face (an upper end face) connected to the drive unit 2 and extends to the valve hole 8a, as shown in FIG. 2. In this insertion through hole 8d, the rod 10 is inserted. The rod 10 inserted through the insertion through hole 8d extends across the valve hole 8a in a direction perpendicular to the flow passage 30.

The rod 10 is made of stainless steel which is corrosion-resistant and heat-resistant, and formed in a columnar shape by machining.

Three O-rings 18, 19, and 20 are arranged between the rod 10 and the inner peripheral surface of the insertion through hole 8d in the axial direction of the rod 10. Those O-rings 18, 19, and 20 are compressed between the outer peripheral surface of the rod 10 and the inner peripheral surface of the insertion through hole 8d, thus preventing leakage of a fluid flowing through the flow passage 30 to the drive unit 2 via the insertion through hole 8d. The three O-rings 18, 19, and 20 are the same kind of O-rings.

The other end (a lower end in FIG. 2) of the rod 10 on a side inserted in the flow passage 30 is rotatably supported by a bush 22. The bush 22 is made of resin that is high in corrosion resistance and excellent in slidability. The rod 10 is rotatably supported by ball bearings 21A and 21B arranged outside the valve body 8 and adjacently in the axial direction of the rod 10. This rod 10 is rotatably supported with its both ends by the ball bearings 21A and 21B and the bush 22. Since the rod is in such a both-end supported state, its rotation axis is stabilized and less likely to wobble.

The portion of the rod 10 inserted in the flow passage 30 is provided with a valve-element mounting part 10b. To this valve-element mounting part 10b, the butterfly valve element 9 made by machining of stainless steel that is corrosion-resistant and heat-resistant into a disc form is secured with screws 25A, 25B, and 25C and washers 26A, 26B, and 26C as shown in FIG. 2. Those three screws 25A, 25B, and 25C are all the same kind of screws and those three washers 26A, 26B, and 26C are all the same kind of washers.

Since the butterfly valve element 9 is connected to the rod 10, when the motor shaft 11a of the servo motor 11 rotates in a normal direction K about the axis RA, the rod 10 coupled to the motor shaft 11a through the coupling 17 is rotated about the central axis (coaxial with the axis RA of the motor shaft 11a) in the normal direction K and accordingly the butterfly valve element 9 is also rotated in the same direction. In contrast, when the motor shaft 11a of the servo motor 11 rotates in a negative direction −K about the axis RA, the rod 10 coupled to the motor shaft 11a through the coupling 17 is rotated in the direction −K and the butterfly valve element 9 is also rotated in the same direction.

The butterfly valve element 9 shown in FIG. 2 is in a fully closed position. When the rod 10 is rotated in the normal direction K from this position, the butterfly valve element 9 closing the valve hole 8a is rotated in the same direction, thereby opening the passage 30. When the passage 30 is opened, exhaust gas is allowed to release from the vacuum chamber 32. The 90°-turn position of the rod 10 in the normal direction K corresponds to the fully open position of the butterfly valve element 9.

When the butterfly valve element 9 is in the fully open position and then the motor shaft 11a of the servo motor 11 rotates 90° about the axis RA in the negative direction −K opposite the direction K for valve opening, the rod 10 is also rotated in the direction −K and, the butterfly valve element 9 comes to a closed position to close the valve hole 8a as shown in FIG. 2.

As described above, the storage unit 145 has stored a rotation angle of the motor shaft 11a (that is, a rotation angle of the rod 10 and the butterfly valve element 9) corresponding to any target pressure value of the vacuum chamber 32. Based on a rotation angle read from the storage unit 134, the motor driver 12 controls the rotation of the servo motor 11. Accordingly, the butterfly valve element 9 is controlled to an opening degree, between the fully closed position and the fully open position, corresponding to any target pressure value of the vacuum chamber 32.

The opening degree of the butterfly valve element 9 is controlled by counting the pulses output by the encoder 14. That is, the number of pulse counts, which is also referred to as the pulse count number, for control of the opening degree of the butterfly valve element 9 is referred to as the number of control counts, which is also referred to as the control count number. For instance, assuming that the encoder resolution is 131072 pulses, it shows a rotation of 0.0027° per one pulse. When the butterfly valve element 9 is rotated in the opening direction (in the normal direction K), the control count number is counted up, thereby enabling discrimination about what degree of angle the butterfly valve element 9 is rotated in the opening direction. When the butterfly valve element 9 is rotated in the closing direction (in the negative direction −K), the control count number is counted down, thereby enabling discrimination as to what degree of angle the butterfly valve element 9 is rotated in the closing direction. For instance, when the number of control counts is counted up by 100 pulses, it is determinable that the butterfly valve element 9 has rotated by 0.27° in the opening direction. In contrary, when the number of control counts is counted down by 100 pulses, it is determinable that the butterfly valve element 9 has rotated by 0.27° in the closing direction.

Accordingly, when the rotation angle corresponding to arbitral target pressure value of the vacuum chamber 32 is read from the storage unit 134, the butterfly valve element 9 is rotated until the control count number reaches a value corresponding to this read rotation angle, and stopped when the number of control counts reaches the value. In an example of the butterfly valve element 9 that is rotatable by 0.0027° per one pulse, when the rotation angle read from the storage unit 134 is 27°, the butterfly valve element 9 is rotated until the number of control counts reaches 10000 and then stopped when the number of control counts reaches the 10000.

Operations of the abnormal vibration detection program 132a will be described below.

As a precondition, operations of the butterfly valve element 9 while the pressure value of the vacuum chamber 32 is stable will be described below. When the butterfly valve element 9 is stopped at a rotation angle corresponding to an arbitral target pressure value of the vacuum chamber 32, the pressure value of the vacuum chamber 32 is assumed as being at the target pressure value in a stable state. Even while the internal pressure of the vacuum chamber 32 remains stable at the target pressure value, however, the butterfly valve element 9 is not always held constant at the opening degree corresponding to the target pressure value without moving at all. That is, in order to keep the pressure stable, the butterfly valve may repeat minute variation or change of the opening degree (hereinafter, simply referred to as minute variation) under the pressure control.

Figure 3:
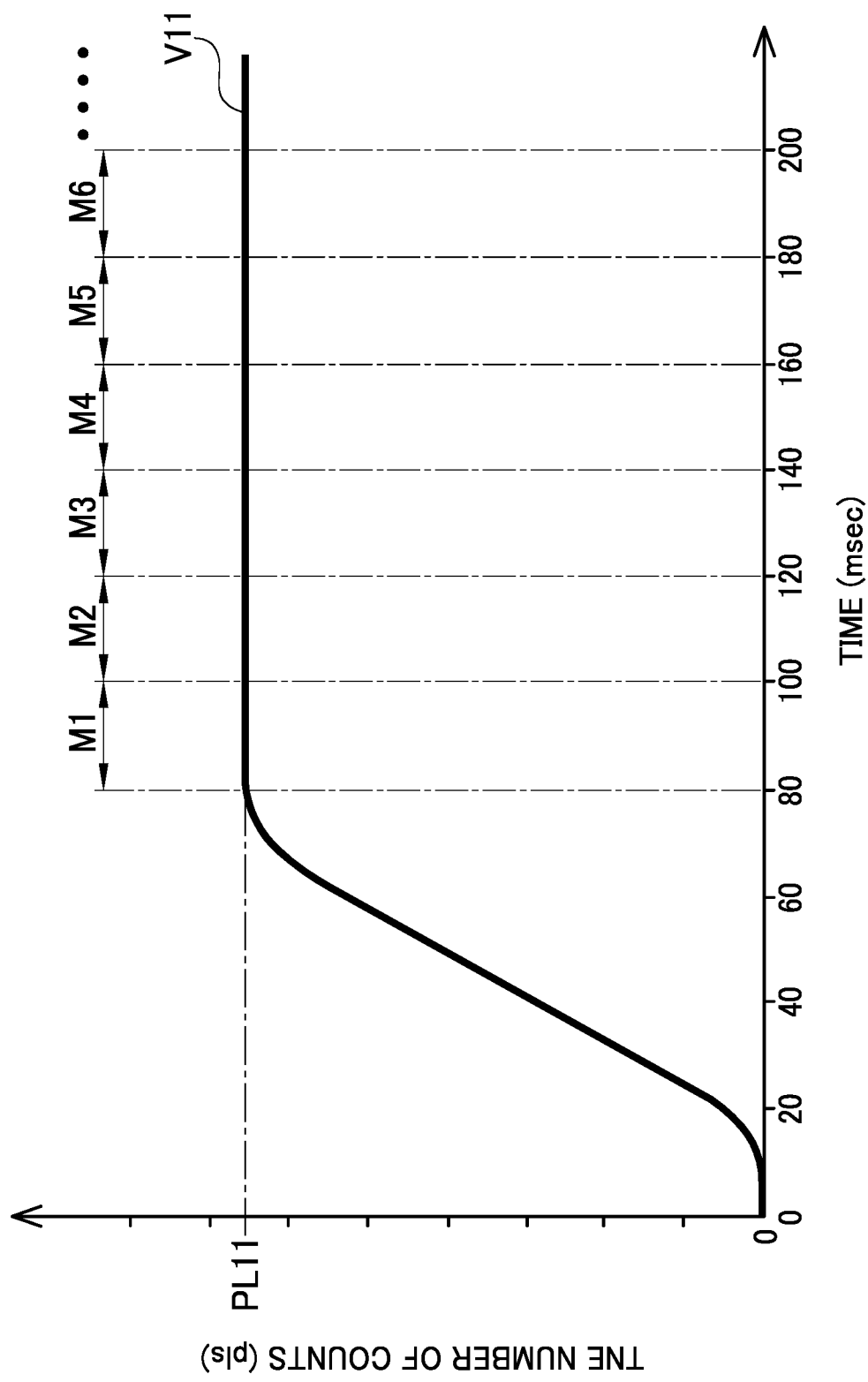
FIG. 3 is a graph showing a relationship between time and the number of control counts when a butterfly valve element is rotated.
Figure 4:
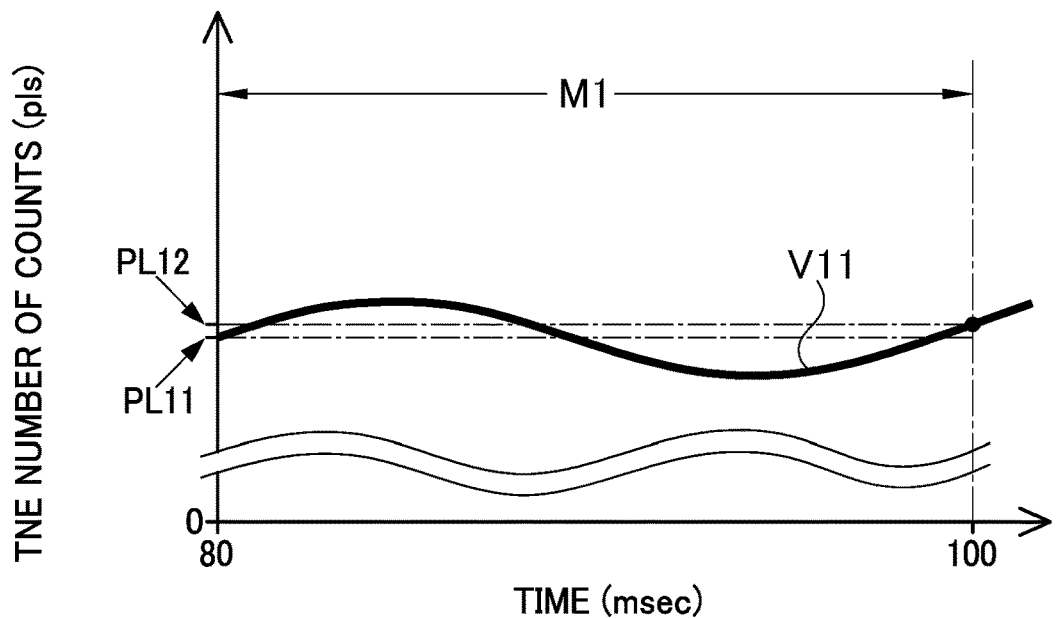
FIG. 4 is an enlarged graph showing a time period from a time point 80 msec to a time point 100 msec in FIG. 3.

This minute variation will be described below referring to FIGS. 3 and 4. FIG. 3 is a graph showing a relationship between the time and the control count number when the butterfly valve element 9 is rotated from the opening degree corresponding to the control count number 0 to an opening degree corresponding to the control count number PL11 (e.g., when the butterfly valve element 9 is rotated from the fully closed position to the fully open position). FIG. 4 is an enlarged graph showing a time period from a time point 80 msec to a time point 100 msec in FIG. 3.

The behaviors of a waveform V11 shown in FIG. 3 represent that the butterfly valve element 9 is rotated from an opening degree for a control count number 0 to an opening degree for the control count number PL11 during a period from a time point 0 msec to a time point 80 msec. This is based on an angle corresponding to the control count number PL11, read from the storage unit 134 as the angle corresponding to an arbitral target pressure value of the vacuum chamber 32. The waveform V11 appearing at the time point 80 msec and subsequent represents that the butterfly valve element 9 is in a stable state at the opening degree corresponding to the control count number PL11.

From the time point 80 msec, the opening degree remains stable. However, as seen in FIG. 4 showing an enlarged graph of the time period from 80 msec to 100 msec, for example, the waveform V11 is wavy. This indicates that the butterfly valve element 9 repeats minute variation of the opening degree, that is, the butterfly valve element 9 repeats slight rotation in the normal direction K and rotation in the negative direction −K. In other words, this means that minute variation under the foregoing pressure control is repeatedly performed.

The minute variation mentioned above is a normal motion. However, the present applicant found that, the butterfly valve element 9 also minutely moves when the servo motor 11 has abnormally vibrated. Furthermore, the comparison between the cycle of the normal minute variation under the pressure control and the cycle of the minute variation due to abnormal vibration of the servo motor 11 revealed that the cycle of the minute variation in an abnormal state is as short as about one-several tenth of the cycle of the minute variation in a normal state of the servo motor 11. Accordingly, the utilization of the minute variation enables to determine whether or not the servo motor 11 is abnormally vibrating. To be concrete, the actual variation amount of the butterfly valve element 9 and the accumulated variation amount are utilized to determine whether or not the abnormal vibration is occurring in the servo motor 11.

For example, the minute variation shown in FIG. 4 is focused as below. The variation amount of the opening degree of the butterfly valve element 9 in a period from a time point 80 msec to a time point 100 msec is represented by a difference between the control count number PL11 and the control count number PL12 by comparison between the opening degree of the butterfly valve element 9 at the time point 80 msec (the control count number PL11) and the opening degree of the butterfly valve element 9 at the time point 100 msec (the control count number PL12). This difference is an actual variation amount. For example, when the number of control counts at the time point 80 msec is 5715 pulses and the number of control counts at the time point 100 msec is 5700 pulses, the difference is 15 pulses. This is the actual variation amount of the opening degree of the butterfly valve element 9 between the time point 80 msec and the time point 100 msec. For example, when the butterfly valve element 9 is to be rotated by 0.0027° per 1 pulse, the actual variation amount of the butterfly valve element 9 is 0.0405°.

However, actually, as seen from the wavy, or fluctuating, waveform V11, the butterfly valve element 9 repeatedly minutely rotates in the normal direction K and in the negative direction −K. Thus, if the variation amount of the butterfly valve element 9 between the time point 80 msec and the time point 100 msec is accumulated irrespective of the normal direction K and the negative direction −K, the accumulated variation amount is a larger value than the foregoing actual variation amount. If the servo motor 11 has abnormally vibrated, the cycle of the minute variation is as short as one-several tenth than in the normal state. Thus, the accumulated variation amount becomes larger than in the normal state and a gap between the accumulated variation amount and the actual variation amount becomes large. Accordingly, a predetermined threshold is set and it is monitored whether or not the difference between the accumulated variation amount and the actual variation amount is this threshold or more, so that the normal minute variation under pressure control and the minute variation caused when the servo motor 11 is abnormally vibrating can be distinguished. Hence, it can be determined that abnormal vibration is occurring in the servo motor 11.

From the above circumferences, in each of monitoring time periods M1 to M6 segmented by 20 msec which is shorter than the cycle of the minute variation in the normal state while the pressure value of the vacuum chamber 32 is stable, that is, the opening degree of the butterfly valve element 9 is stable (e.g., at and after the time point 80 msec in FIG. 3), the abnormal vibration detection program 132a is configured to calculate a difference between (i) the actual variation amount corresponding to the difference between the opening degree of the butterfly valve element 9 at the starting time point t11 of each monitoring time period M1 to M6 (see FIGS. 5 to 7) and the ending time point t12 of each monitoring time period M1 to M6 (see FIGS. 5 to 7) and (ii) the accumulated variation amount obtained by accumulation of the variation amount of the butterfly valve element 9 in the period from the starting time point to the ending time point of each monitoring time period M1 to M6. Further, the abnormal vibration detection program 132a is configured to determine that abnormal vibration is occurring in the servo motor 11 when the difference exceeds the predetermined threshold. In the present embodiment, the monitoring time is expressed by six segments, M1 to M6, but the number of segments is not limited thereto. This number of segments may vary with control conditions, such as the length of time in which the pressure value of the vacuum chamber 32 is in a stable state.

The abnormal vibration detection program 132a uses the first number of pulse counts (also referred to as the first pulse count number) to calculate the actual variation amount and the second number of pulse counts (also referred to as the first pulse count number) to calculate the accumulated variation amount. These first and second pulse count numbers are both calculated based on pulses output by the encoder.

The first pulse count number is calculated in a manner that it assumed as 0 at the starting time point t11 of each monitoring time period M1 to M6 and then counted up when the butterfly valve element 9 rotates in the opening direction and counted down when the butterfly valve element 9 rotates in the closing direction. On the other hand, the second pulse count number is calculated in a manner that it is assumed as 0 at the starting time point t11 of each monitoring time period M1 to M6 and then counted up irrespective of the rotation direction of the butterfly valve element 9.

The actual variation amount is expressed by the difference between the first pulse count number (i.e., 0) at the starting time point t11 of the monitoring time period M1 to M6 and the first pulse count number at the ending time point t12 of each monitoring time period M1 to M6. The difference between the control count number counts PL11 and the control count number counts PL12 is mentioned as the actual variation amount in the foregoing description; however, this is intended only to explain the concept of the actual variation amount. In the abnormal vibration detection program 132a, the actual variation amount is calculated by the first pulse count number as described above.

The accumulated variation amount is expressed by the difference between the second pulse count number (i.e., 0) at the starting time point t11 of each monitoring time period M1 to M6 and the second pulse count number at the ending time point t12 of each monitoring time period M1 to M6.

Figure 5:
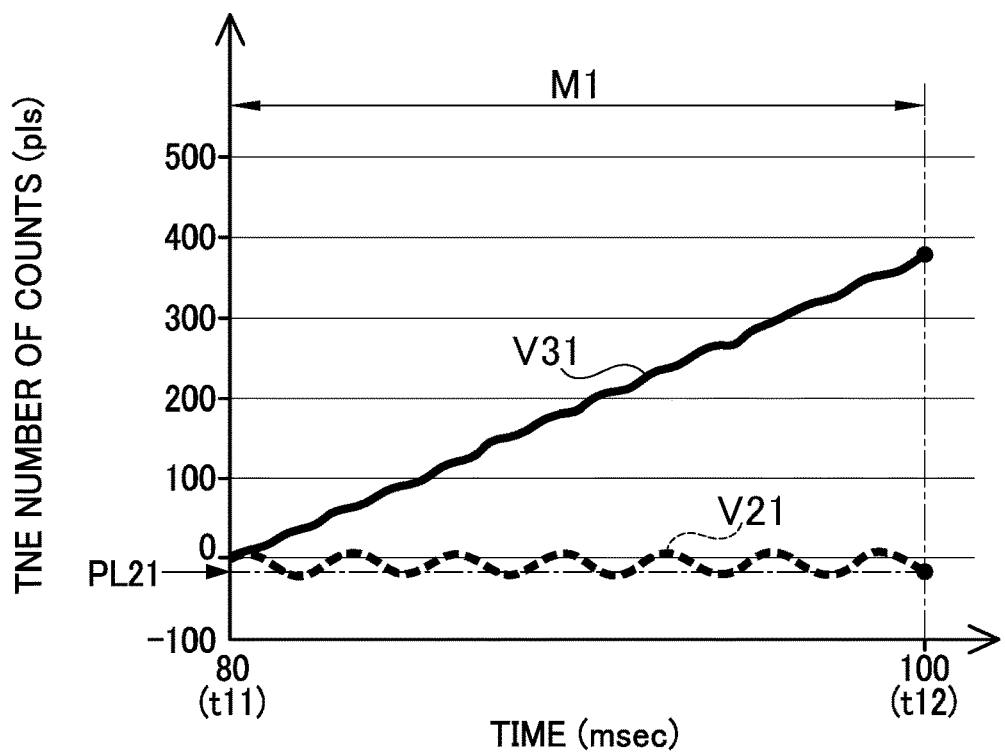
FIG. 5 is a graph showing behaviors of the first number of pulse counts and the second number of pulse counts while minute variation is repeated due to abnormal vibration of a servo motor.
Figure 6:
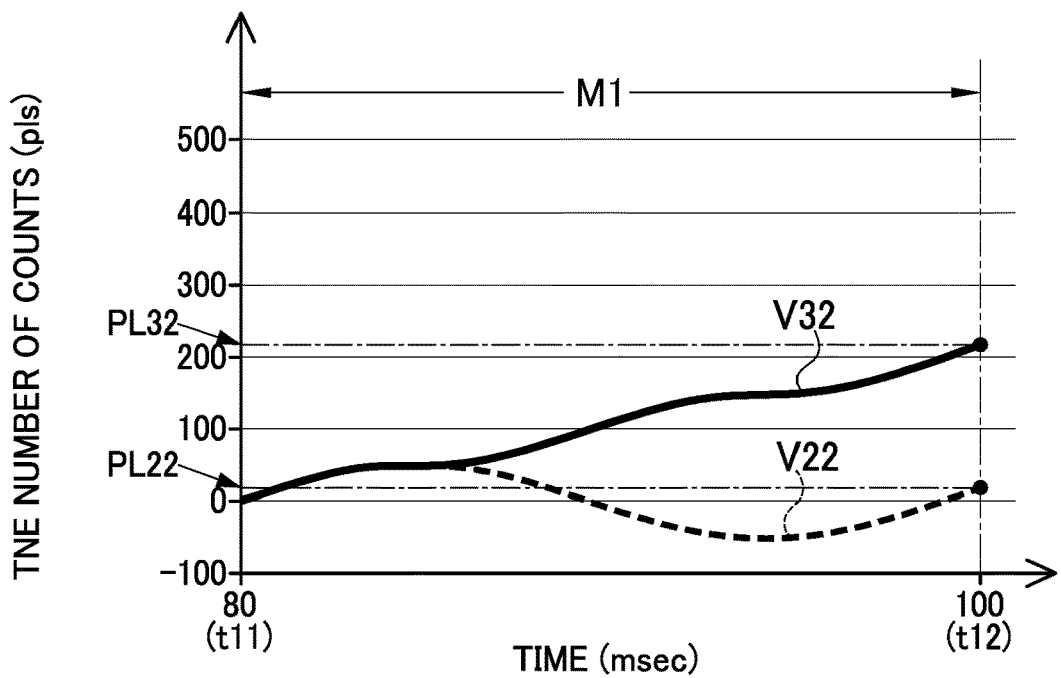
FIG. 6 is a graph showing behaviors of the first number of pulse counts and the second number of pulse counts while normal minute variation is repeated under pressure control.
Figure 7:
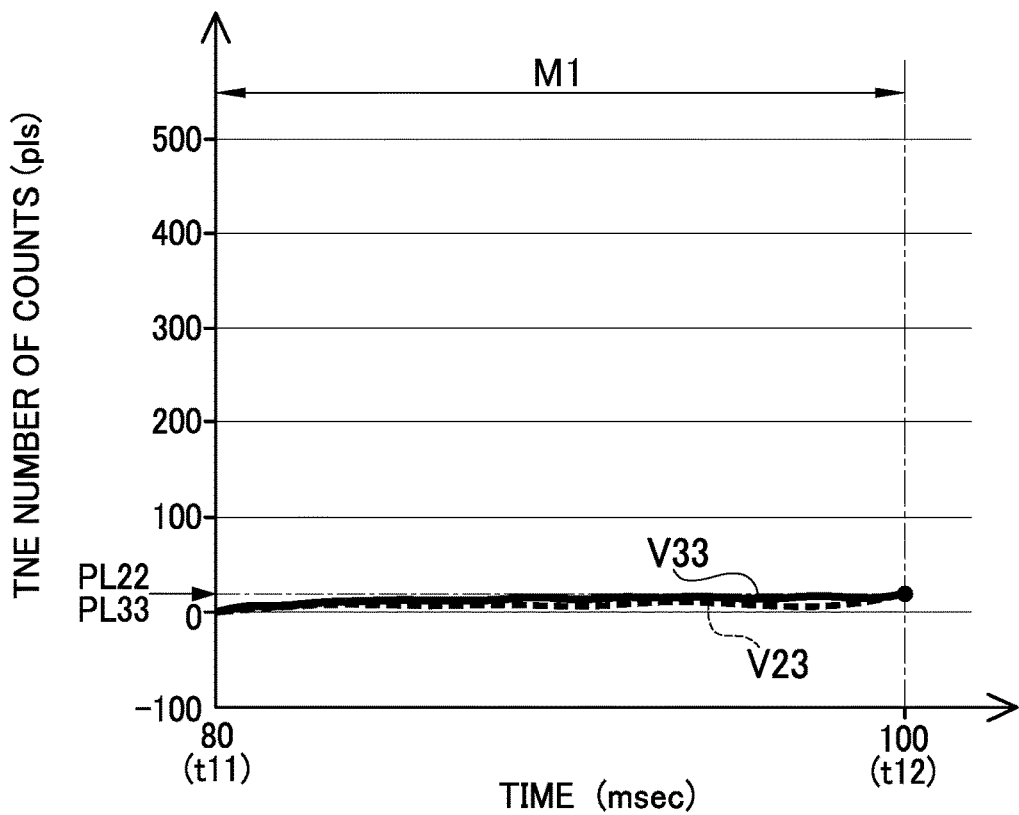
FIG. 7 is a graph showing behaviors of the first number of pulse counts and the second number of pulse counts while minute variation of the butterfly valve element hardly occurs.
Figure 8:
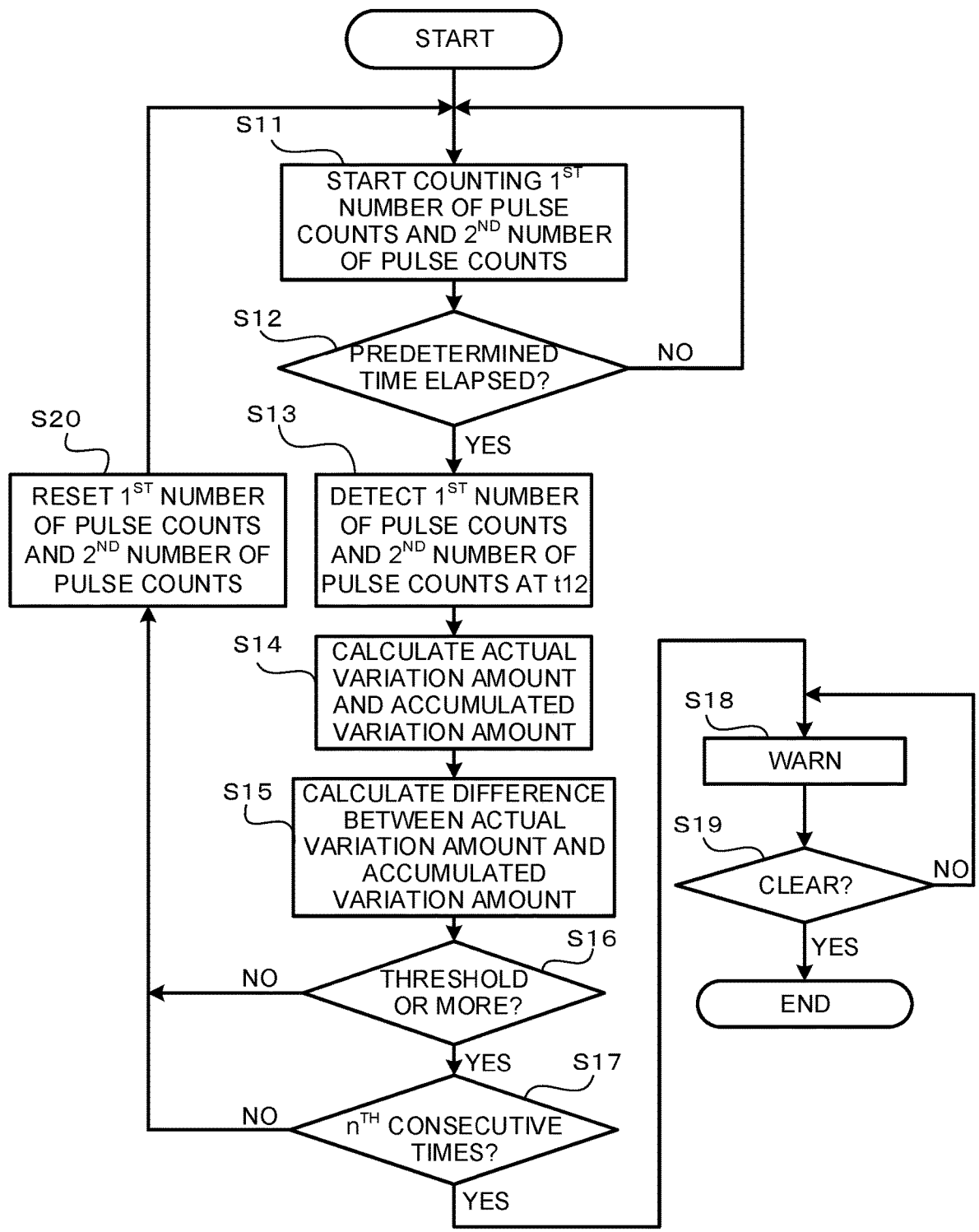
FIG. 8 is a flowchart showing operations of an abnormal vibration detection program.

Operations of the abnormal vibration detection program 132a will be described in detail below with reference to FIGS. 5 to 8. FIG. 5 is a graph showing behaviors of the first pulse count number and the second pulse count number in the monitoring time period M1 while the minute variation is repeated due to the abnormal vibration of the servo motor 11. FIG. 6 is a graph showing behaviors of the first pulse count number and the second pulse count number in the monitoring time period M1 while normal minute variation is repeated under the pressure control. FIG. 7 is a graph showing behaviors of the first pulse count number and the second pulse count number in the monitoring time period M1 while minute variation hardly occurs at all in the butterfly valve element 9. In each of FIGS. 5 to 7, the vertical axis indicates values of the first pulse count number and the second pulse count number and the horizontal axis indicates time. In these graphs, waveforms V21, V22, and V23 represent the behaviors of the first pulse count number, and waveforms V31, V32, and V33 represent the behaviors of the second pulse count number. FIG. 8 is a flowchart showing the operations of the abnormal vibration detection program 132a.

The abnormal vibration detection program 132a is configured to start operating from when the opening degree of the butterfly valve element 9 is stable, for example, at the time point 80 msec at which the pressure value of the vacuum chamber 32 becomes stable as shown in FIG. 3, and monitor whether or not abnormal vibration is occurring in the servo motor 11 in each of the monitoring time periods M1 to M6 segmented by 20 msec.

The control unit 13 starts counting the first pulse count number and the second pulse count number from the starting time point t11 of the monitoring time period M1 (S11 in FIG. 8). As shown in FIGS. 5 to 7, the first pulse count number and the second pulse count number at the starting time point t11 of the monitoring time period M1 is 0.

The first pulse count number and the second pulse count number are continuously counted until the ending time point t12 of the monitoring time period M1 which is set to a predetermined time (S12: NO).

The first pulse count number is counted up when the butterfly valve element 9 rotates in the opening direction, while counted down when the butterfly valve element 9 rotates in the closing direction, so that the the first pulse count number varies up and down as indicated by the waveform V21 shown in FIGS. 5 and 6 due to the minute variation of the butterfly valve element 9. The cycle of the minute variation when abnormal vibration has occurred in the servo motor 11 is shorter than the cycle of the minute variation when the servo motor 11 is normal. Thus, by comparison between FIGS. 5 and 6, the frequency of the waveform V21 representing the actual variation amount when abnormal vibration has occurred in the servo motor 11 is larger than the frequency of the waveform V22 representing the actual variation amount when the servo motor 11 is in the normal state. In FIG. 7, minute variation of the butterfly valve element 9 hardly occurs at all. The waveform V23 does not repeatedly vary up and down, differently from the waveforms V21 and V22, so that the waveform V23 slowly changes from the count number 0 to the counter number PL22. This means that, in FIG. 7, the butterfly valve element 9 slightly rotates only in the opening direction.

Since the pulse count number is counted up irrespective of the rotation direction of the butterfly valve element 9, the pulse count number increases in proportion to time as plotted by the waveforms V31, V32, and V33 respectively shown in FIGS. 5, 6, and 7. The cycle of the minute variation caused when abnormal vibration has occurred in the servo motor 11 is shorter than the cycle of minute variation when the servo motor 11 is in the normal state. Thus, the variation amount accumulated during abnormal vibration of the servo motor 11 is larger than the variation amount accumulated during the normal state of the servo motor 11. Accordingly, by comparison between FIGS. 5 and 6, the inclination of the waveform V31 representing the accumulated variation amount when the abnormal vibration has occurred in the servo motor 11 is steeper than the inclination of the waveform V32 representing the accumulated variation amount during the normal state. In FIG. 7, since the butterfly valve element 9 minutely rotates only in the opening direction as mentioned above, the waveform V33 behaves the same way as the waveform V23.

After a lapse of the monitoring time period (S12: YES), the control unit 13 detects the first pulse count number (PL21, PL22, or PL23 in FIGS. 5 to 7) and the second pulse count number (PL31, PL32, or PL33 in FIGS. 5 to 7) at the ending time point t12 of the monitoring time period M1 (S13).

The control unit 13 successively calculates the actual variation amount and the accumulated variation amount of the butterfly valve element 9 based on the first and second pulse count numbers detected in S13 (S14).

The actual variation amount is a value obtained by subtracting the first pulse count number (0) at the starting time point t11 from the first pulse count number (PL21, PL22, or PL23) at the ending time point t12. For example, each actual variation amount in FIGS. 5 to 7 is about 10 pulses.

The accumulated variation amount is a value obtained by subtracting the second pulse count number (0) at the starting time point t11 from the second pulse count number (PL31, PL32, or PL33) at the ending time point t12. For example, the accumulated variation amount in FIG. 5 is about 380 pulses. The accumulated variation amount in FIG. 6 is about 210 pulses. The accumulated variation amount in FIG. 7 is the same value (about 10 pulses) as the actual variation amount.

The control unit 13 obtains a difference between the actual variation amount and the accumulated variation amount (S15). To be concrete, the control unit 13 obtains this difference by subtracting the actual variation amount from the accumulated variation amount. For example, the difference between the actual variation amount and the accumulated variation amount in FIG. 5 is about 370 pulses. The difference between the actual variation amount and the accumulated variation amount in FIG. 6 is about 200 pulses. The difference between the actual variation amount and the accumulated variation amount in FIG. 7 is 0 pulse because the actual variation amount is equal to the accumulated variation amount.

The control unit 13 determines whether or not the calculated difference between the actual variation amount and the accumulated variation amount in S15 is equal to or more than the threshold (S16). For example, when the threshold is set to 350, the difference between the actual variation amount and the accumulated variation amount in FIG. 5 is about 370 pulses and thus determined to be larger than the threshold. The difference between the actual variation amount and the accumulated variation amount in FIG. 6 is about 200 pulses and the difference between the actual variation amount and the accumulated variation amount in FIG. 7 is 0 pulse and hence these differences are determined to be smaller than the threshold.

When the difference is smaller than the threshold (S16: NO), the first pulse count number and the second pulse count number, each counted in the monitoring time period M1, are reset to 0 (S20) and then the abnormal vibration detection program 132a performs the process in S11 and subsequent steps in the next monitoring time period M2. In the monitoring time period M2, similarly, when the difference is determined to be smaller than the threshold in S16 (S16: NO), the first pulse count number and the second pulse count number counted in the monitoring time period M2 are reset to 0 (S20) and then the abnormal vibration detection program 132a performs the process in S11 and subsequent steps in the next monitoring time period M3. In this way, the same processes are repeated in each of the monitoring time periods M1 to M6. For this repetition of processes, the starting time point of a monitoring time period to be started coincides with the ending time point of a last monitoring time period. For example, the ending time point t12 of the monitoring time period M1 coincides with the starting time point t11 of the monitoring time period M2.

On the other hand, when the difference between the actual variation amount and the accumulated variation amount calculated in S15 is larger than the threshold (S16: YES), it is determined whether or not the difference becomes the threshold or more for the $n^{th}$ consecutive time (S17). If the difference becomes the threshold or more the $n^{th}$ time in a row (S17: YES), it is given a warning that the motor is in an abnormal state (S18). The numerical value, n, can be arbitrarily set by a user of the butterfly valve 1. For example, when the $n^{th}$ consecutive time is set as the third consecutive time, if the difference between the actual variation amount and the accumulated variation amount is consecutively determined to be the threshold or more (S17: YES) during the successive monitoring time periods M1 to M3 or during the successive monitoring time periods M2 to M4, it is given a warning that abnormality has occurred in the motor (S18).

On the other hand, when the difference between the actual variation amount and the accumulated variation amount becomes the threshold or more only once, i.e., not for the $n^{th}$ consecutive time (S17: NO), no warning is given and the first pulse count number and the second pulse count number counted in the monitoring time period M1 are reset to 0 (S20), and then the abnormal vibration detection program 132a performs the process in S11 and subsequent steps in the next monitoring time period M2. In the monitoring time period M2, similarly, when the $n^{th}$ consecutive time is not determined S17 (S17: NO), the first pulse count number and the second pulse count number counted in the monitoring time period M2 are also reset to 0 (S20), and further the abnormal vibration detection program 132a performs the process in S11 and subsequent steps in the next monitoring time period M3. In this way, the same processes are repeated in each of the monitoring time periods M1 to M6. For this repetition of processes, the starting time point of a monitoring time period to be started coincides with the ending time point of a last monitoring time period. For example, the ending time point t12 of the monitoring time period M1 coincides with the starting time point t11 of the monitoring time period M2.

When the difference is the threshold or more in S16, it is considered that abnormal vibration is occurring in the servo motor 11. However, even if abnormality is not actually occurring in the motor (the servo motor 11), e.g., if the internal pressure of the vacuum chamber 32 under control overshoots the target pressure value and thus the variation of the opening degree of the butterfly valve element 9 intended to adjust such an overshoot is determined as abnormal vibration, the abnormal vibration detection program 132a may determine that abnormal vibration is occurring in the motor (the servo motor 11). Therefore, if the difference becomes the threshold or more in multiple consecutive monitoring time periods, it is given a warning that abnormality is occurring in the servo motor 11.

This warning is continued until an operator clears the warning (S19: NO). When the warning is cleared (S19: YES), the abnormal vibration detection program 132a is terminated.

Since whether or not abnormal vibration is occurring is determined based on the variation amount of the opening degree of the butterfly valve element 9 as described above, any additional components, such as an accelerator sensor, are not necessary, so that cost increase is prevented. Even when the butterfly valve 1 is incorporated in a semiconductor manufacturing device, it is possible to reliably detect the vibration of only the servo motor 11 without being confused by the vibrations generated in many driving mechanisms of the semiconductor manufacturing device. This makes it possible to avoid abnormal vibration from being left uncontrolled and hence prevent breakage of the butterfly valve 1, such as wearing of the 0 rings 18, 19, and 20 and the bush 22 and breakage of the ball bearings 21A and 21B. This can further prevent a deterioration in semiconductor manufacturing efficiency.

The time length of each monitoring time period M1 to M6 is set to 20 msec in the foregoing description, but is not limited thereto and may be set by a user of the butterfly valve 1 to any time length sufficiently shorter than the cycle of the minute variation (the waveform V22) in the normal state of the servo motor 11. The foregoing threshold is set to 350, but is not limited thereto and may be set by a user of the butterfly valve 1 to any value based on a desired time at which the servo motor 11 should be determined to be abnormally vibrating when the minute variation of the butterfly valve element 9 is repeated with which extent of variation amount (corresponding to amplitudes of the waveform V21, V22, or V23) and at which cycle ((corresponding to the frequency of the waveform V21, V22, or V23).

For example, in order to judge that the servo motor 11 is abnormally vibrating when the butterfly valve element 9 repeats variation corresponding to a control count number of 25 pulses (0.04°) with a frequency of 350 Hz, the time length of each monitoring time period M1 to M6 is set to 20 msec, so that the threshold is a value calculated by multiplying the foregoing frequency by a value as twice as the foregoing amplitude and the foregoing monitoring time; 350 Hz×2×25 pulses×0.02 sec=350.

In the above description, the abnormal vibration detection program 132a is configured to operate from the time point 80 msec at which the pressure value of the vacuum chamber 32 is stable, for example, the opening degree of the butterfly valve element 9 is stable as shown in FIG. 3. The abnormal vibration detection program 132a may be configured to operate during rotation of the butterfly valve element 9 toward an angle read from the storage unit 134, e.g., in a period from 0 to 80 msec shown in FIG. 3.

(1) The butterfly valve 1 in the present embodiment, as described above, to be placed on the pipe 34 between the vacuum chamber 32 provided with the pressure sensor 35 and the vacuum pump 33 and configured to control the pressure in the vacuum chamber 32, the butterfly valve 1 includes: the motor (e.g., the servo motor 11); the butterfly valve element 9 configured to rotate about the motor shaft 11a of the motor (the servo motor 11) in the opening direction (e.g., the normal direction K) and the closing direction (e.g., the negative direction −K); and the control unit 13 configured to adjust the opening degree of the butterfly valve element 9 based on the pressure value of the vacuum chamber 32 detected by the pressure sensor 35. The control unit 13 is provided with the abnormal vibration detection program 132a configured to determine whether or not the abnormal vibration is occurring in the motor (the servo motor 11) based on the variation amount of the opening degree of the butterfly valve element 9 within the predetermined time (e.g., the monitoring time periods M1 to M6) while at least the pressure value of the vacuum chamber 32 is stable.

The butterfly valve 1 described in (1) can reliably detect the abnormal vibration that occurs in the motor (the servo motor 11) and also avoid cost increase.

To adjust the internal pressure of the vacuum chamber 32 to the target pressure value, the opening degree of the butterfly valve element 9 of the butterfly valve 1 is to be controlled to an opening degree corresponding to the target pressure value. However, even when the internal pressure of the vacuum chamber 32 reaches the target pressure value and further remains stable thereat, the butterfly valve element 9 is not always held constant at a predetermined opening degree without moving at all. That is, in order to keep the pressure stable, the butterfly valve element 9 may repeat minute variation or change of the opening degree (hereinafter, minute variation (e.g., the waveform V22)) under the pressure control. In such a circumference, as described above, the present applicant found that the minute variation (e.g., the waveform V21) is also caused when abnormal vibration has occurred in the servo motor 11 and further found that the cycle of minute variation is different between the normal minute variation (the waveform V22) that occurs under the pressure control and the minute variation (the waveform V21) that occurs when the servo motor 11 is abnormally vibrating. The cycle of the minute variation (the waveform V21) caused when the abnormal vibration is occurring in the motor is as short as about one-several tenth of the cycle of the minute variation (the waveform V22) in the normal state of the servo motor 11. Since the control unit 13 is provided with the abnormal vibration detection program 132a configured to determine whether or not the abnormal vibration is occurring in the motor (the servo motor 11) based on the variation amount of the opening degree of the butterfly valve element 9 within the predetermined time (e.g., a sufficient short time (e.g., 20 msec) as compared with the cycle of the minute variation in the normal state (the waveform V22) while the pressure value in the vacuum chamber 32 is stable, it is possible to distinguish between the normal minute variation under the pressure control and the minute variation caused due to the abnormal vibration of the servo motor 11, and hence detect the abnormal vibration of the motor (the servo motor 11).

The abnormal vibration detection program 132a determines whether or not the abnormal vibration is occurring based on the variation amount of the opening degree of the butterfly valve element 9 without directly detecting vibration using an accelerator sensor or the like. Thus, any additional component, such as an accelerator sensor, is not necessary, so that cost increase is prevented. As above, whether or not the abnormal vibration is occurring is determined based on the variation amount of the opening degree of the butterfly valve element 9. Accordingly, even when the butterfly valve is incorporated in a semiconductor manufacturing device it is possible to reliably detect the vibration of only the motor (the servo motor 11) without being confused by other vibrations of many driving mechanisms of the semiconductor manufacturing device. This can prevent the abnormal vibration from being left uncontrolled, leading to breakage of the butterfly valve 1, and thus can prevent a decrease in the efficiency of semiconductor manufacturing.

The predetermined time is arbitrarily set to a sufficiently short time (e.g., to 40 msec) as compared with the cycle of the minute variation (the waveform V22) in the normal state depending on how much variation of the butterfly valve element 9 is judged to be abnormal that is set according to the usage condition of the butterfly valve 1.

(2) In the butterfly valve 1 described in (1), the abnormal vibration detection program 132a judges that abnormal vibration is occurring in the motor (the servo motor 11) when the difference between (i) the actual variation amount corresponding to a difference between the opening degree of the butterfly valve element 9 at the starting time point t11 of the predetermined time (each of the monitoring time periods M1 to M6) and the opening degree of the butterfly valve element 9 at the ending time point t12 of the predetermined time (each of the monitoring time periods M1 to M6) and (ii) the accumulated variation amount obtained by accumulation of the variation amounts of the butterfly valve element 9 from the starting time point t11 to the ending time point t12 is the predetermined threshold or more.

The butterfly valve 1 described in (2) can detect the abnormal vibration of the motor (the servo motor 11).

The present applicant found that, while the motor (the servo motor 11) is abnormally vibrating, a gap is generated between the actual variation amount corresponding to the difference between the opening degree of the butterfly valve element 9 at the starting time point t11 of the predetermined time (each monitoring time period M1 to M6) and the opening degree of the butterfly valve element at the ending time point t12 of the predetermined time (each monitoring time period M1 to M6) and the accumulated variation amount obtained by accumulation of the variation amounts of the butterfly valve element 9 from the starting time point t11 to the ending time point t12. Accordingly, when the difference between the actual variation amount and the accumulated variation amount is observed as exceeding the predetermined threshold, it is possible to determine that the abnormal vibration is occurring in the motor (e.g., the servo motor 11). The predetermined threshold is arbitrarily set depending on how much variation of the butterfly valve element is determined to be abnormal that is set according to the usage condition of the butterfly valve.

(3) In the butterfly valve 1 described in (2), the motor (the servo motor 11) is provided with the encoder 14; the abnormal vibration detection program 132a is configured to calculate the first pulse count number (e.g., the waveforms V21, V22, and V23) to be used for calculation of the actual variation amount based on the pulses output by the encoder 14 and the second pulse count number (e.g., the waveforms V31, V32, and V33) to be used for calculation of the accumulated variation amount; the first pulse count number is calculated by counting up when the butterfly valve element 9 rotates in the opening direction (the normal direction K) or the closing direction (the negative direction −K) and by counting down when the butterfly valve element 9 rotates in the opposite direction to the direction for which the first pulse count number is counted up; the actual variation amount is represented by the difference between the first pulse count number at the starting time point t11 and the first pulse count number at the ending time point t12; the second pulse count number is calculated by counting up irrespective of the rotation direction of the butterfly valve element 9; and the accumulated variation amount is represented by the difference between the second pulse count number at the starting time point t11 and the second pulse count number at the ending time point t12.

The butterfly valve 1 described in (3) can determine whether or not abnormal vibration is occurring in the motor (the servo motor 11) based on whether or not the difference between the actual variation amount and the accumulated variation amount, each calculated based on the pulses output by the encoder 14 of the motor (the servo motor 11) exceeds the predetermined threshold.

(4) In the butterfly valve 1 described in any one of (1) to (3), when a determination that the abnormal vibration is occurring in the motor (the servo motor 11) is consecutively made a predetermined number of times within multiple consecutive predetermined time periods, the abnormal vibration detection program 132a give a warning that abnormality has occurred in the motor (the servo motor 11).

The butterfly valve 1 described in (4) can reliably ascertain whether or not abnormality is occurring in the motor (the servo motor 11).

Even when abnormality is not actually occurring in the motor (the servo motor 11); for example, if the internal pressure of the vacuum chamber 32 overshoots the target pressure value and thus the variation of the opening degree of the butterfly valve element 9 intended to adjust such an overshoot is erroneously determined as abnormal vibration, the abnormal vibration detection program 132a may determine that abnormal vibration is occurring in the motor (the servo motor 11). Thus, whether or not abnormality is actually occurring in the motor (the servo motor 11) may not be reliably ascertained by only one determination made by the abnormal vibration detection program 132a that abnormal vibration is occurring in the motor (the servo motor 11). In the above configuration, therefore, when a determination that abnormal vibration is occurring in the motor (the servo motor 11) is consecutively made a predetermined number of times within the multiple consecutive predetermined time periods (the monitoring time periods M1 to M6), it is given a warning that abnormality has occurred in the motor (the servo motor 11). This configuration can reliably ascertain whether or not abnormality is occurring in the motor (the servo motor 11).

(5) In the butterfly valve 1 described in any one of (1) to (4), the motor is the servo motor 11.

Along with the recent popularization of ALD, a servo motor 11 having a high response performance is used as a motor for rotating a butterfly valve element in some cases. The servo motor 11 with increased gain to increase a response speed exhibits an excessively high response. Even when the butterfly valve element 9 is desired to stop at a predetermined opening degree, the butterfly valve element 9 is less likely to stop and may repeat unnecessary minute variation. This repeated unnecessary minute variation may cause the occurrence of abnormal vibration in the servo motor 11. According to the present disclosure, however, while at least the pressure value in the vacuum chamber 32 is stable, the abnormal vibration detection program 132a determines whether or not abnormal vibration is occurring in the motor based on the variation amount of the opening degree of the butterfly valve element 9 within the predetermined time (the monitoring time periods M1 to M6). Thus, even when the servo motor 11 is used in the butterfly valve 1, the abnormal vibration caused by unnecessary repeated variations of the opening degree is not left uncontrolled, so that breakage of the butterfly valve 1 can be prevented.

The foregoing embodiments are mere examples and give no limitation to the present disclosure. The present disclosure may be embodied in other specific forms without departing from the essential characteristics thereof. For instance, the first pulse count number and the second pulse count number are each set to 0 at the starting time point t11, but do not always have to be set to 0. In this case, the abnormal vibration detection program 132a can calculate the actual variation amount and the accumulated variation amount even without resetting the first pulse count number and the second pulse count number (S20).

REFERENCE SIGNS LIST

1 Butterfly valve
9 Butterfly valve element
10 Rod (one example of a rotary shaft)
11 Servo motor (one example of a motor)
13 Control unit
32 Vacuum chamber
33 Vacuum pump
34 Pipe
35 Pressure sensor
132 Abnormal vibration detection program

What is claimed is:
1. A butterfly valve configured to be placed on a pipe between a vacuum chamber with a pressure sensor and a vacuum pump, and configured to control pressure in the vacuum chamber, the butterfly valve comprising:
- a motor coupled to a rotary shaft and including an encoder;
- a butterfly valve element configured to rotate about the rotary shaft in an opening direction and a closing direction; and
- a control unit configured to adjust an opening degree of the butterfly valve element based on a pressure value of the vacuum chamber, the pressure being detected by the pressure sensor, wherein
- the control unit includes an abnormal vibration detection program configured to determine whether abnormal vibration is occurring in the motor based on a variation amount of the opening degree of the butterfly valve element within a predetermined time period, the variation amount being calculated based on a pulse output from the encoder, while at least the pressure value of the vacuum chamber is stable,
- the predetermined time period is shorter than a cycle of a minute variation in a normal state, which is a variation of the opening degree of the butterfly valve element to keep the pressure in the vacuum chamber stable, and
- when a difference between (i) an actual variation amount corresponding to a difference between an opening degree of the butterfly valve element at a starting time point of the predetermined time period and an opening degree of the butterfly valve element at an ending time point of the predetermined time period and (ii) an accumulated variation amount obtained by accumulation of the variation amount of the butterfly valve element from the starting time point to the ending time point is equal to or larger than a predetermined threshold, the abnormal vibration detection program is configured to distinguish minute variation of the opening degree of the butterfly valve element caused when the motor is abnormally vibrating from the minute variation in the normal state, and determine that the abnormal vibration is occurring in the motor.

2. The butterfly valve according to claim 1, wherein
the abnormal vibration detection program is configured to calculate first number of pulse counts for calculation of the actual variation amount and second number of pulse counts for calculation of the accumulated variation amount based on a pulse output by the encoder,
the first number of pulse counts is calculated by counting up when the butterfly valve element rotates in the opening direction or closing direction or by counting down when the butterfly valve element rotates in an opposite direction to the direction for which the first number of pulse counts is counted up,
the actual variation amount is a difference between the first number of pulse counts at the starting time point and the first number of pulse counts at the ending time point,
the second number of pulse counts is calculated by counting up irrespective of the direction of rotation of the butterfly valve element, and
the accumulated variation amount is a difference between the second number of pulse counts at the starting time point and the second number of pulse counts at the ending time point.

3. The butterfly valve according to claim 2, wherein
when a determination that abnormal vibration is occurring in the motor is consecutively made a predetermined number of times within multiple consecutive predetermined time periods, the abnormal vibration detection program is configured to give a warning that abnormality has occurred in the motor.

4. The butterfly valve according to claim 3, wherein the motor is a servo motor.

5. The butterfly valve according to claim 2, wherein the motor is a servo motor.

6. The butterfly valve according to claim 1, wherein
when a determination that abnormal vibration is occurring in the motor is consecutively made a predetermined number of times within multiple consecutive predetermined time periods, the abnormal vibration detection program is configured to give a warning that abnormality has occurred in the motor.

7. The butterfly valve according to claim 6, wherein the motor is a servo motor.

8. The butterfly valve according to claim 1, wherein the motor is a servo motor.

* * * * *